(12) United States Patent
   Carrion (10) Patent No.: US 9,398,175 B2
(45) Date of Patent: Jul. 19, 2016

(54) IMAGE CAPTURE AND DISSEMINATION SYSTEMS AND METHODS

(71) Applicant: Vanity IP LLC, Brentwood, NY (US)

(72) Inventor: Kenneth Carrion, Nesconset, NY (US)

(73) Assignee: Vanity IP LLC, Brentwood, NY (US)

( * ) Notice: Subject to any disclaimer, the term of this patent is extended or adjusted under 35 U.S.C. 154(b) by 38 days.

(21) Appl. No.: 14/205,708

(22) Filed: Mar. 12, 2014

(65) Prior Publication Data

US 2014/0267794 A1    Sep. 18, 2014

Related U.S. Application Data

(60) Provisional application No. 61/777,948, filed on Mar. 12, 2013.

(51) Int. Cl.
   *H04N 1/00* (2006.01)
(52) U.S. Cl.
   CPC ....... *H04N 1/00143* (2013.01); *H04N 1/00148* (2013.01); *H04N 1/00169* (2013.01); *H04N 1/00188* (2013.01); *H04N 1/00456* (2013.01)
(58) Field of Classification Search
   CPC .......... H04N 1/00143; H04N 1/00169; H04N 1/00188; H04N 1/00148; H04N 1/00456
   USPC ...................................................... 348/207.2
   See application file for complete search history.

(56) References Cited

U.S. PATENT DOCUMENTS

| | | | |
|---|---|---|---|
| 6,369,908 B1* | 4/2002 | Frey et al. | 358/1.15 |
| 7,885,522 B2* | 2/2011 | Gassman et al. | 396/2 |
| 8,144,257 B2* | 3/2012 | Ryckman | 348/722 |
| 2006/0282288 A1* | 12/2006 | Rodriguez et al. | 705/2 |
| 2010/0008657 A1 | 1/2010 | Gassman et al. | |
| 2012/0120257 A1* | 5/2012 | Corn et al. | 348/207.1 |

OTHER PUBLICATIONS

PCT Search Report for PCT/US2014/024067, dated Aug. 1, 2014.

* cited by examiner

*Primary Examiner* — Gevell Selby
(74) *Attorney, Agent, or Firm* — Remenick PLLC (57) ABSTRACT

Systems and methods of using the system for obtaining an image of a user and survey data from the user are disclosed. The system comprises a processor, a digital imaging device in communication with the processor, at least one input device in communication with the processor, at least one output device in communication with the processor, and software executing on the processor. The software prompts the user to enter an answer to at least one survey question through the input device, directs the digital imaging device to obtain at least one image of the user upon receiving the answer and outputs the at least one image to the output device.

32 Claims, 13 Drawing Sheets

IMAGE CAPTURE AND DISSEMINATION SYSTEMS AND METHODS

REFERENCE TO RELATED APPLICATIONS

This application claims priority to U.S. Provisional Application No. 61/777,948, filed Mar. 12, 2013, entitled "Image Capture and Dissemination Systems and Methods," and is hereby specifically and entirely incorporated by reference.

BACKGROUND OF THE INVENTION

1. Field of the Invention

This invention relates to the field of digital imaging, and more particularly to web-enabled, data collection during digital imaging.

2. Description of the Background

A photo booth is a vending machine or kiosk that contains an automated, often coin-operated, camera and printing device. Today many photo booths employ digital cameras. Traditionally, photo booths contain a seat or bench designed to seat the one or two patrons being photographed. The seat is typically surrounded by a curtain or other divider to allow for some privacy and avoid outside interference during the photo session. Once the payment is made, the photo booth typically will take at least one photograph. Before each photograph, there may be an indication, such as a light or a buzzer, which will signal the patron to prepare to be photographed. After the last photograph in the series (typically between 3 and 8) has been taken, the photo booth begins developing the film or processes the images and provides printouts of the photographs to the customer.

Typical dimensions of these prints vary. The classic and most familiar arrangement from the old style photo booths is four pictures on a strip about 40 mm wide by 205 mm long. Digital prints often have a square arrangement of a grid of four photographs. Both black and white and color photo booths are common. However, newer digital booths offer the customer the option of whether to print in color, black and white, or another photo-effect. Most modern photo booths use video or digital cameras instead of film cameras, and are under computer control. Some booths can produce stickers, postcards, or other items with the photographs on them, in addition to a strip of pictures. These often include an option of novelty decorative borders around the photos.

SUMMARY

The present invention overcomes the problems and disadvantages associated with current strategies and designs and provides new systems and methods of obtaining participant data and outputting images.

One embodiment of the invention is directed to a system of obtaining an image of a user and survey data from the user. The system comprises a processor, a digital imaging device in communication with the processor, at least one input device in communication with the processor, at least one output device in communication with the processor, and software executing on the processor. The software prompts the user to enter an answer to at least one survey question through the input device, directs the digital imaging device to obtain at least one image of the user, and outputs the at least one image to the output device.

Preferably, the at least one input device is chosen from the group comprising a touch screen, a keyboard, a microphone, a computer mouse, and a digital imaging device. In a preferred embodiment, the at least one output device is chosen from the group comprising a screen, a printer, a connection to a wide area network, a connection to a local area network, and a connection to the Internet. Preferably, at least one input device and at least one output device are both a touch screen.

In a preferred embodiment, the system further comprises a housing, wherein the processor, the digital imaging device, at least one input device, and at least one output device are contained within the housing. Preferably, the housing is a photo booth. The software preferably prompts the user to choose a layout for the at least one outputted image. In a preferred embodiment, the choice of layouts is determined by a system administrator. Each layout is preferably created by the system administrator.

Preferably, the software further prompts the user to enter personal information. The personal information is at preferably least one of an email address and social networking data. In a preferred embodiment, the software collects multiple answers to the at least one survey question, compiles a database of answers, and outputs a report of the compiled answers. Preferably, the software collects multiple images, compiles a database of images, and outputs the compiled images. Preferably, software outputs the compiled images to a website. In a preferred embodiment, the software collects usage statistics, compiles a database of usage statistics, and outputs a report of the compiled usage statistics.

In a preferred embodiment, the software further prompts a system administrator to create an event. Preferably, software further prompts the system administrator to select options to be presented to the user during the event. The software preferably maintains multiple events simultaneously. Preferably, the output is a printed photograph.

Another embodiment of the invention is directed to a method of obtaining an image of a user and survey data from the user. The method comprises, on a processor, prompting the user to enter an answer to at least one survey question through at least one input device, directing a digital imaging device to obtain at least one image of the user, and outputting the at least one image to at least one output device.

Preferably, the at least one input device is chosen from the group comprising a touch screen, a keyboard, a microphone, a computer mouse, and a digital imaging device. In a preferred embodiment, the at least one output device is chosen from the group comprising a screen, a printer, a connection to a wide area network, a connection to a local area network, and a connection to the Internet. Preferably, at least one input device and at least one output device are both a touch screen. The processor, the digital imaging device, at least one input device, and at least one output device are preferably contained within a housing. Preferably, the housing is a photo booth.

Preferably, the method further comprises prompting the user to choose a layout for the at least one outputted image. The choice of layouts is preferably determined by a system administrator. Each layout is preferably created by the system administrator. The method preferably further comprises prompting the user to enter personal information. Preferably, the personal information is at least one of an email address and social networking data.

The method preferably comprises collecting multiple answers to the at least one survey question, compiling a database of answers, and outputting a report of the compiled answers. The method preferably comprises collecting multiple images, compiling a database of images, and outputting the compiled images. Preferably, the method comprises outputting the compiled images to a website. The method preferably comprises collecting usage statistics, compiling a database of usage statistics, and outputting a report of the compiled usage statistics.

In a preferred embodiment, the method comprises prompting a system administrator to create an event. Preferably, the method comprises prompting the system administrator to select options to be presented to the user during the event. Preferably, the method comprises maintaining multiple events simultaneously. The output is preferably a printed photograph.

Other embodiments and advantages of the invention are set forth in part in the description, which follows, and in part, may be obvious from this description, or may be learned from the practice of the invention.

BRIEF DESCRIPTION OF THE DRAWINGS

The invention is described in greater detail by way of example only and with reference to the attached drawings, in which.

DETAILED DESCRIPTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
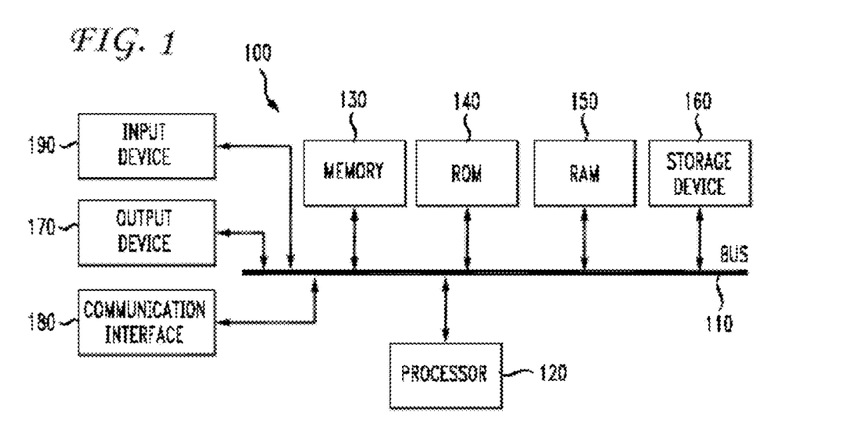
FIG. 1 illustrates an example system embodiment.

With reference to FIG. 1, an exemplary system includes at least one general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, a computer server, a handheld scanning device, or a wireless devices, including wireless Personal Digital Assistants ("PDAs") (e.g., Microsoft's Windows, Research in Motion's Blackberry™, an Android™ device, Apple's iPhone™), tablet devices (e.g., Amazon's Kindle™, Apple's iPad™), wireless web-enabled phones, other wireless phones, etc.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, an imaging device, keyboard, mouse, motion input, speech and so forth. The device output 170 can be one or more of a number of output mechanisms known to those of skill in the art, for example, printers, monitors, projectors, speakers, and plotters. In some embodiments, the output can be via a network interface, for example uploading to a website, emailing, attached to or placed within other electronic files, and sending an SMS or MMS message. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media (or software) for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium.

Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The system is easily configurable for white labeling. As such, the system can be tailored to and/or branded for one or more specific purposes or companies and each such instance can run simultaneously. Each instance of the system may be branded for the third party and the third party could manage its own environment using the internal system controls (DERF/backend interface). Preferably in all such instances, each new instance's environment's subscribers and merchants would be segregated from the original instance (and all other instances) of the system.

Figure 2:
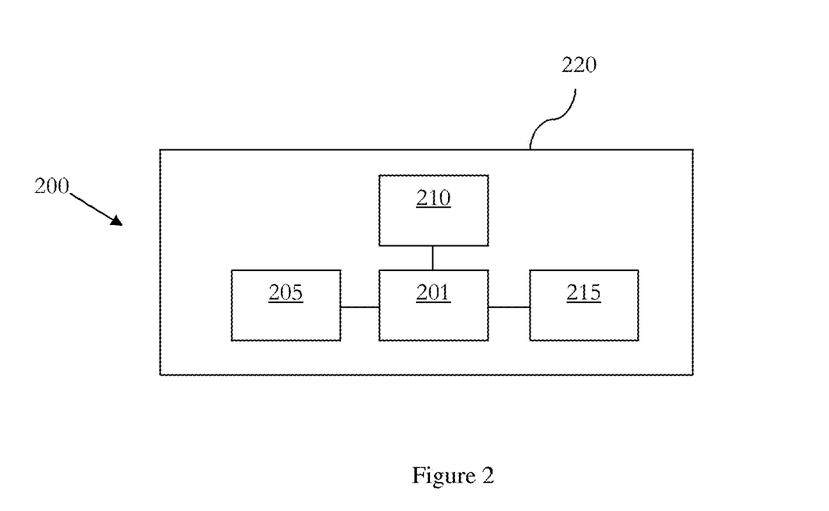
FIG. 2 depicts a schematic of the elements of an embodiment of the system.

FIG. 2 depicts an embodiment of a schematic of the generalized elements of system 200. Processing unit 201 is preferably a computing device that can access the internet or other WAN, as described herein. Processing unit 201 is preferably in data communication with at least one input device 205, at least one output device 210, and at least one imaging device 215. In the preferred embodiment, processing unit 201, input devices 205, output devices 210, and imaging devices 215 are contained in a single housing 220. However, certain elements can be housed separately from the other elements, for example there can be a remote input device 215 and/or a remote output device 210. Preferably housing 220 is a photo booth. However, housing 220 can be a free standing kiosk, a room, or another enclosure. Housing 220 may have a seat, lighting, a curtain, a door, or be otherwise enclosed and private. In some embodiments, the system 200 may not have a housing and the components are a part of a computer, smartphone, tablet, or other computing device.

In a preferred embodiment, input device 205 is a touch screen device. However, input device 205 can be a keyboard, a mouse, a gesture recognizing device, a microphone, or another device capable of obtaining data from a user. Additionally, there can be multiple input devices 205, for example, a keyboard and a mouse.

In a preferred embodiment, output device 210 is a printer. Output device 210 may be a laser printer, an ink jet printer, a 3D printer, or another printing device. Additionally, output device 210 can be a display (e.g. a screen), a speaker, an electronic file, or another output device. Preferably, system 200 is comprised of multiple output devices. For example, system 200 may have a printer and a display screen (e.g. the touch screen) and/or multiple display screens.

Preferably, the imaging device 215 is a digital camera capable of obtaining both color still photographs and color videos. However, imaging device 215 can be a film camera, a video camera that captures video on magnetic tape, a digital scanner, or another device capable of obtaining an image. Preferably, the imaging device converts an image into a digital signal and transmits the signal to the processing unit 201.

Figure 3:
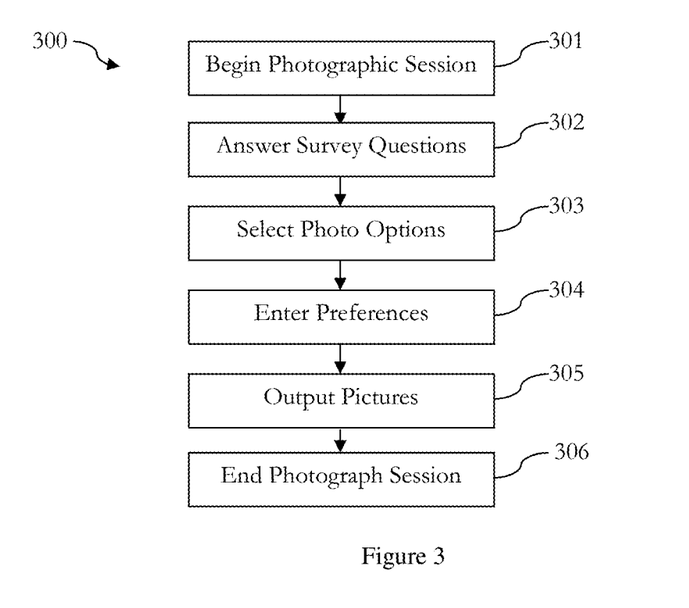
FIG. 3 depicts a flow chart of an embodiment of a method of using a photo booth.

FIG. 3 is a flowchart 300 depicting an embodiment of a method of using the system 200. A patron, customer, or other user enters the housing 220, presses a start (or other) button on the screen, presses a button on a keyboard, clicks a mouse button, or otherwise engages the system 200 to begin a photo session at step 301. While the method is described with respect to a single user, multiple people can use the system 200 simultaneously. The user is preferably presented with a "welcome screen" that displays either a static image or a video. The welcome screen may be branded. Preferably, the user begins the photo session by answering at least one and preferably multiple questions at step 302. The questions may be in the form of a survey. Preferably, each question is multiple choice and can be answered by selecting a radio button. However, the questions can be answered by the user entering text (i.e. a short answer question). In the preferred embodiment, each question is answered before the user can proceed to the next question. Preferably, the questions, answer options, answer format, and other text can be customized by the operator of the system as described herein. Additionally, survey questions may be asked throughout the photographic session and the user may only be able to move to the next step upon answering the survey questions. The system preferably stores the survey questions, compiles a database of answers to the survey questions, and transmits the database for further review.

Figure 4:
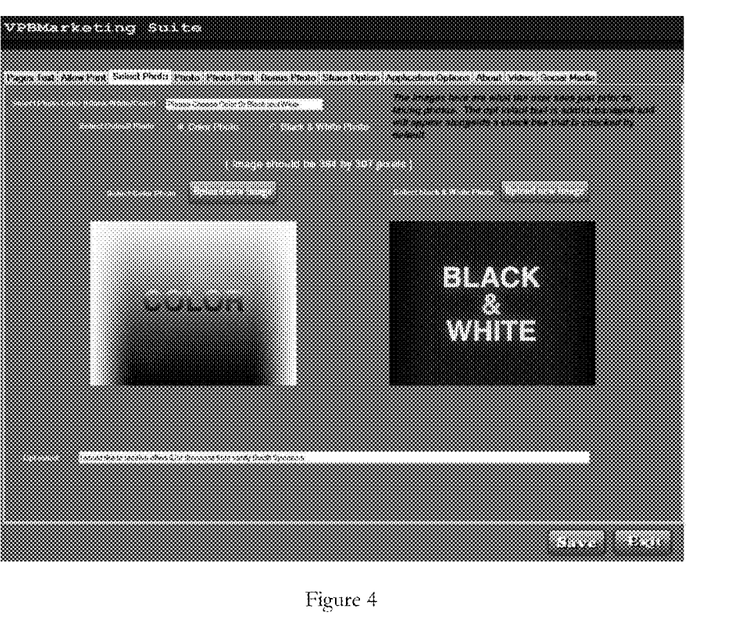
FIGS. 4-24 depict various embodiments of screen shots of the system.

At step 303, the system prompts the user to select a style of photograph. For example, the photograph may be in black and white, color, sepia, reverse colored, or have another photofinish applied. For example, FIG. 4 is a screen shot of the option presented to the user to choose a color photo or a black and white photo. The user may also be prompted to select to have the photos delivered via email or other web service. The user may be able to enter one or more (e.g. 2, 3, or 4) email (or other social networking) addresses to have the photos delivered. Preferably, the system will parse the email address to determine if it is a valid email address and indicate to the user whether or not the email address is valid. By providing an email address, the user, may be entered into a database of email address for future correspondences (the user may be able to opt out of being entered into the database, as shown in FIG. 4). The user may also be presented with an opportunity to select preferences including, but not limited to, choice of print-out, theme of print-out, having coupons, offers, or other advertisements sent to the user, and with whom the photographs can be shared. The user may also have an opportunity to order custom designed souvenirs (e.g. mugs, t-shirts, or other products with the user's photo). The user may also be presented with an opportunity to provide personal information including, but not limited to, a user name and password, e-mail address, age, gender, social networking information, physical address, telephone number, or other demographic information.

Figure 5:
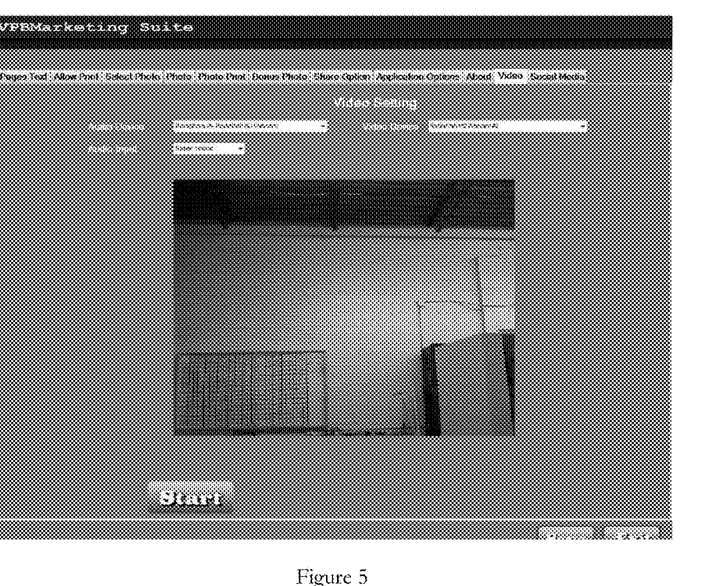

At step 304, the processing unit 201 preferably instructs the imaging device 215 to obtain at least one photograph of the user. In a preferred embodiment, the system 200 will obtain multiple photographs of the user. The system will inform the user that a specific number (e.g. 4, 5, or 6) pictures will be taken. The pictures will preferably be taken by the imaging device 215 and stored in a digital format according to the design formatted in the back end. The user may then be presented with an option of selecting one or more of his or her preferred photographs for printing. The processing unit 201 will preferably process the image(s) and print out the pictures as requested by the user at step 305 and display the final version of the photo to the user. The user may be presented with an option to print out extra copies of the final photo(s) and/or print enlargements of the photo(s). The system 200 may also upload the images to a website (e.g. Facebook, Twitter, or a proprietary website), email the images to the user, or send the images to the user's phone via Multimedia Messaging Service (MMS). Preferably, users may also be able to record an audio or video message to accompany the photo(s) in multimedia formats. For example, FIG. 5 depicts a screen shot of an Audio/Video acquisition screen. Prior to ending the photographic session, the system may present the user with a survey to obtain information about a product, a service, or other information. At step 306, the photo session will end, allowing the user to begin a new photo session or allowing a new user to begin a photo session.

In a preferred embodiment, the printed photographs will include a coupon or other advertisement. The printed photographs may be a strip of photos, several photos arranged on a page, or another configuration of photographs. Preferably each printout will include four photographs, however another number of photographs may be printed.

Preferably, the system 200 save copies of each photograph for later retrieval, uploading to the Internet, or other output. Furthermore, users may be able to return to the system 200 at a later time, have the system take new photographs and print out both the original photographs and the later taken photographs. For example, a user may have their picture taken at the beginning of an event and then retaken at the end of the event.

Figure 6:
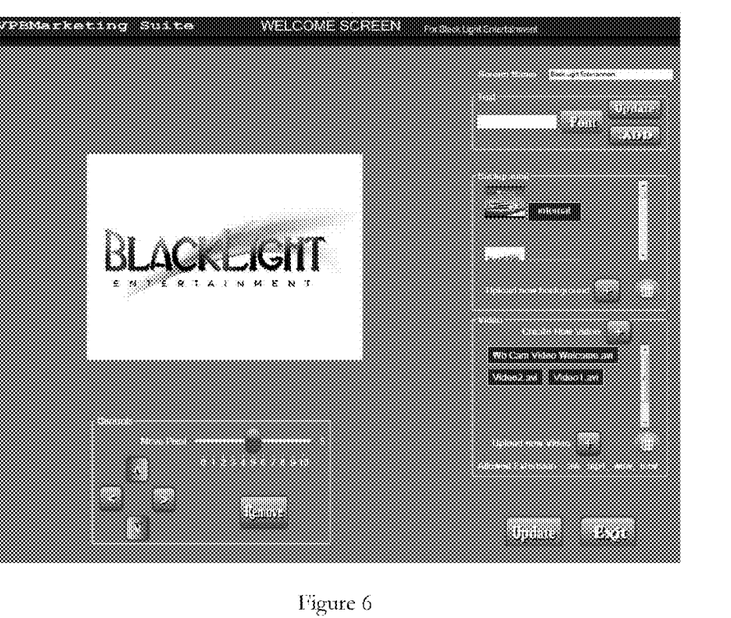
Figure 7:
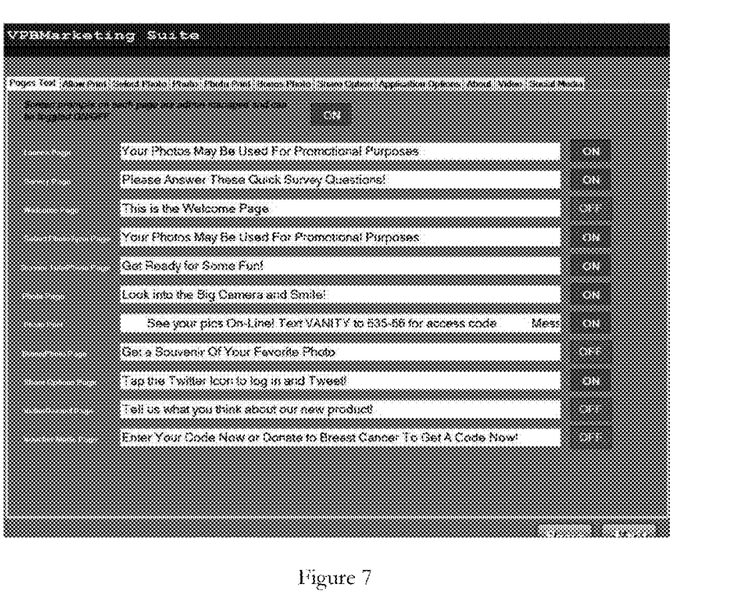
Figure 8:
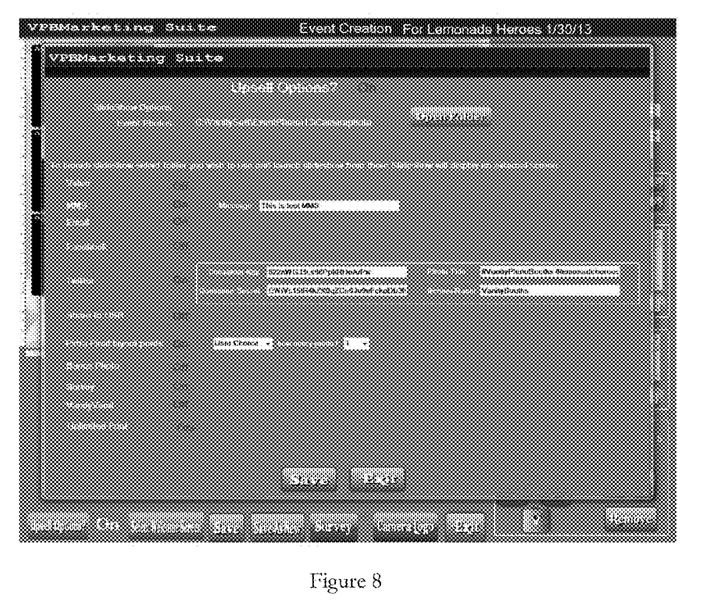

Preferably, the system provides the operator with back end administration tools to customize the look and feel of the user experience by customizing branding and defining the parameters of the sequence of an event by toggling options on or off. For example, FIG. 6 depicts a screen shot of branding customization while FIGS. 7 and 8 depict screen shots of examples of options that an operator can choose to turn on or off.

Figure 9:
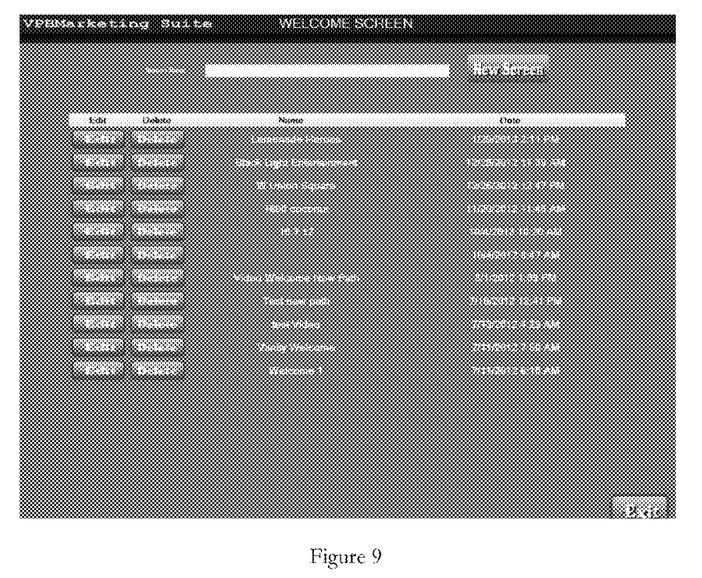
Figure 10:
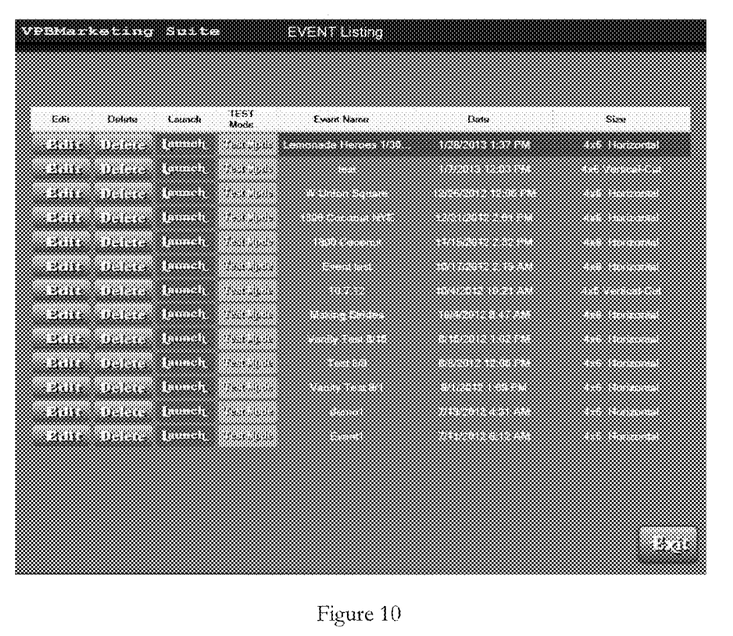
Figure 11:
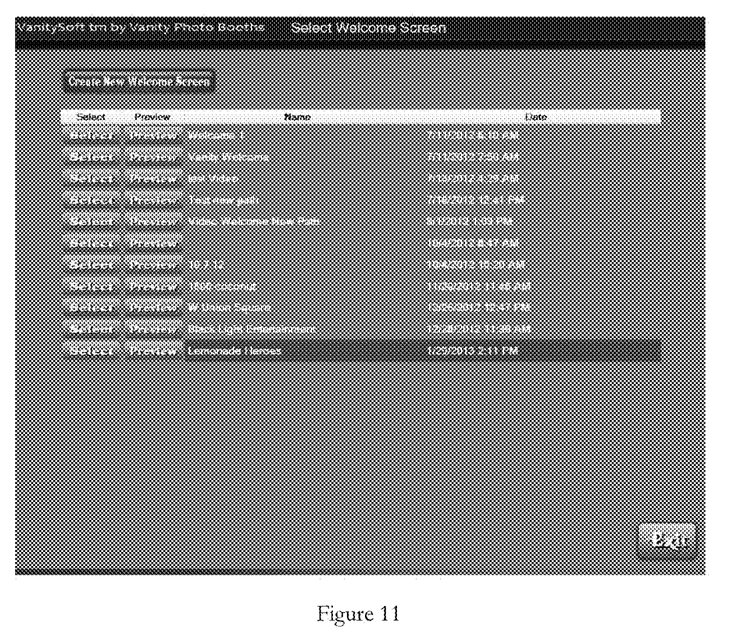
Figure 12:
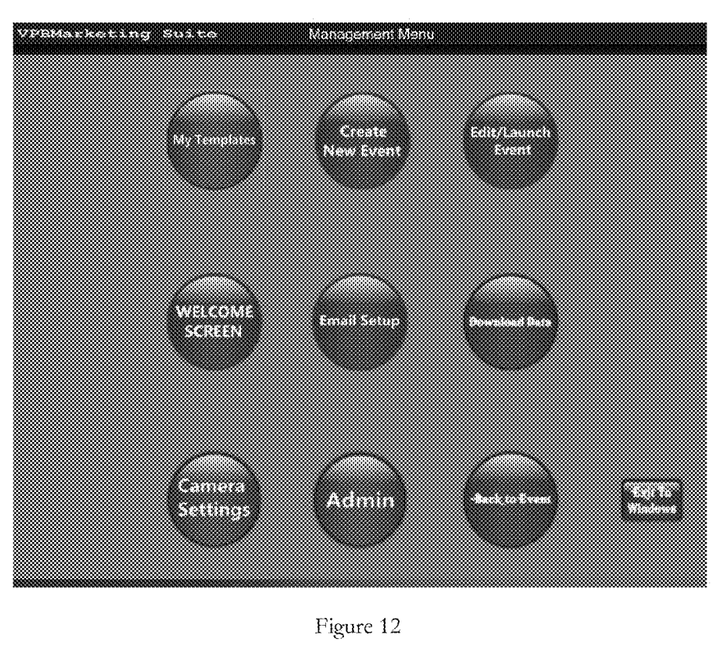

Operators can preferably view, edit, and delete already crated events or create new events. Events can, for example, be for parties, product launch events, ceremonies, carnivals, shows, sporting events, ongoing events (e.g. for use as a mall kiosk), or other times a photo booth is desirable. For example, FIG. 9 depicts a screen shot of an embodiment of a list of already created events. Preferably, multiple events can be programmed at once (for example, FIG. 10 depicts a screen shot of numerous scheduled events, which can be edited, deleted, launched, or tested). Each event may be based on a sponsor's needs or wants and can be customized to reflect those needs or wants. For example, FIG. 11 depicts an embodiment of a screen shot where an operator can create a new welcome screen for an event, or select or preview an existing welcome screen for an event. Preferably, each screen prompt directed to the user is administratively managed. FIG. 12, for example, depicts a screen shot of an administrative management home page.

Figure 13:
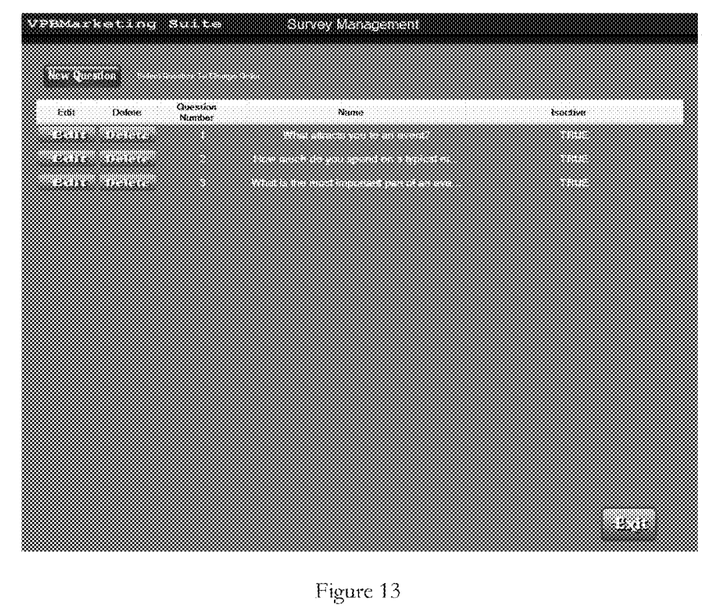
Figure 14:
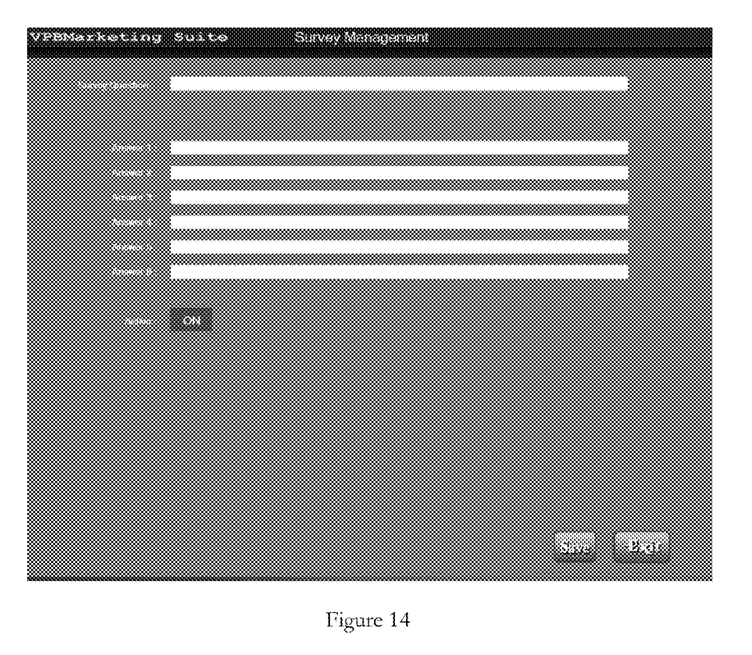

Additionally, the operator may be prompted to create survey questions. Existing survey questions may be able to be inserted into a photo session, or the operator can create new survey questions. For example, FIG. 13 depicts an embodiment of a screen shot showing existing survey questions. Preferably, the operator is able to edit and delete existing survey questions. FIG. 14, for example, depicts an embodiment of a screen shot wherein an operator can create a new survey question.

Figure 15:
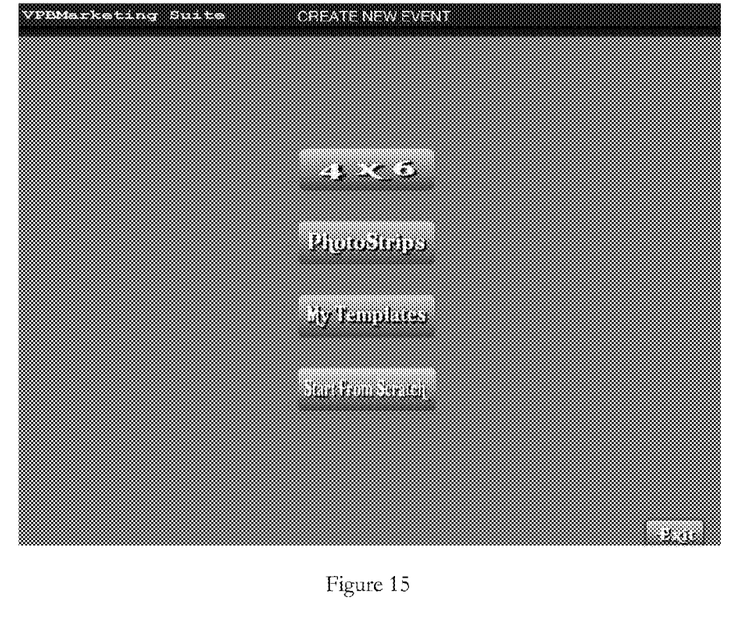
Figure 16:
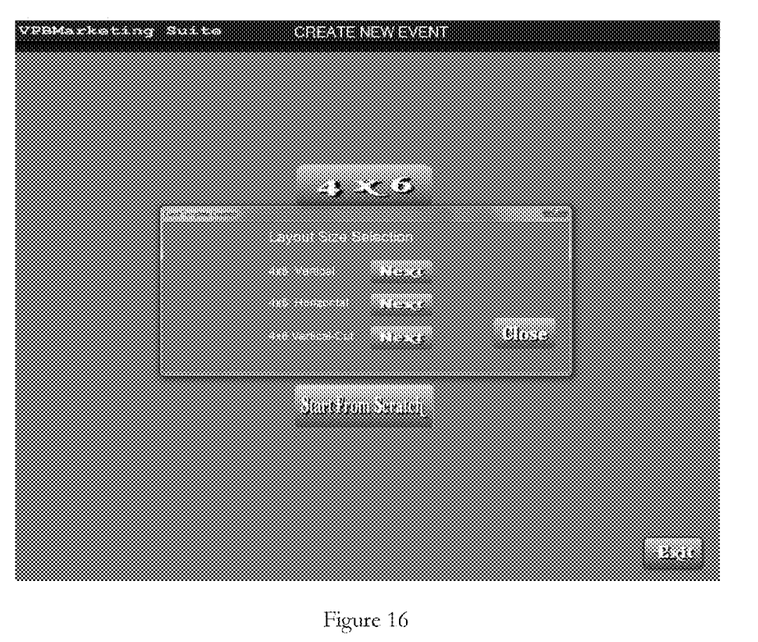
Figure 17:
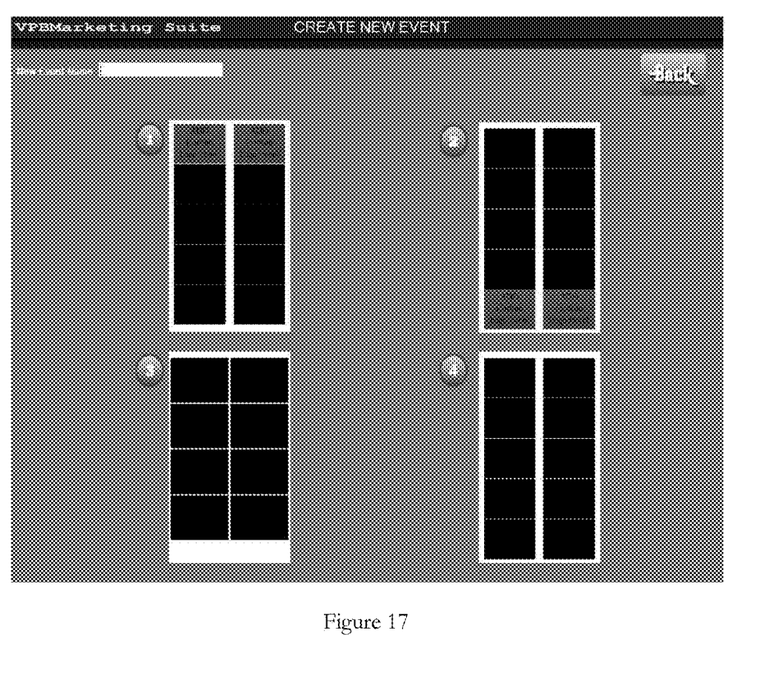
Figure 18:
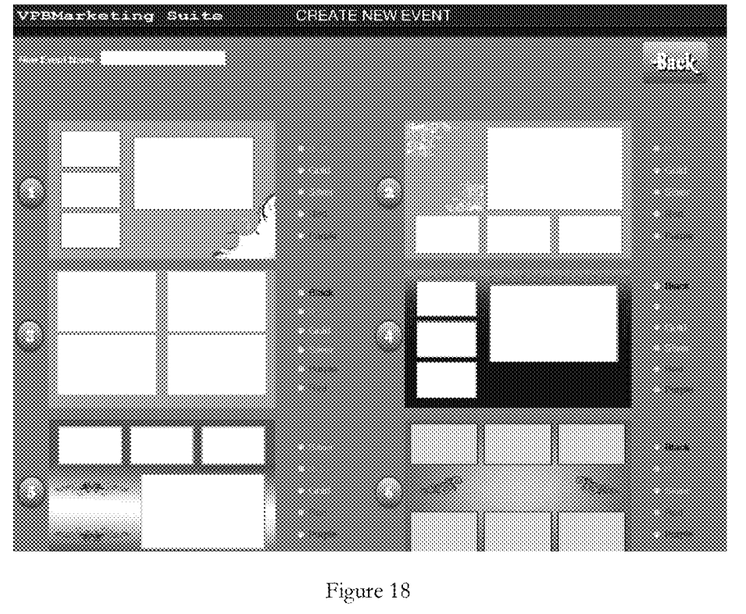
Figure 19:
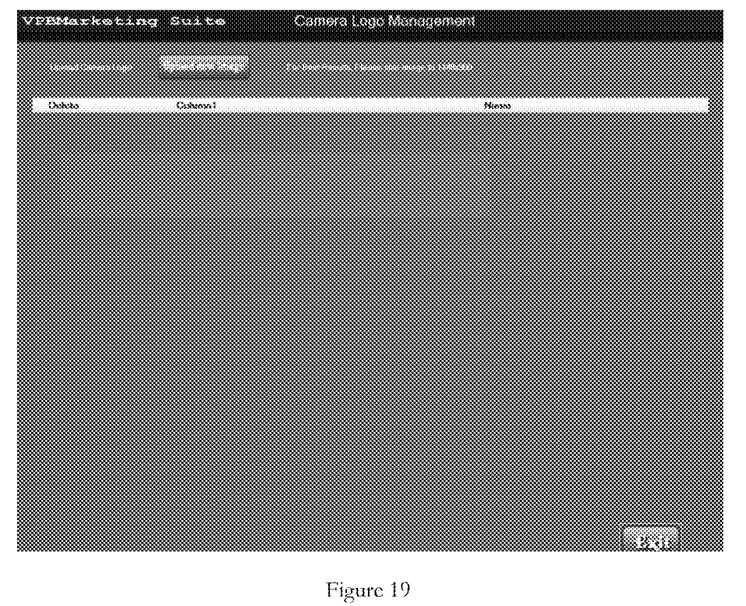

The operator may be presented with the options to design the layout of the final photograph prints. For example, as depicted in the screen shot of FIG. 15, the operator can choose to design a 4×6 layout (as depicted in the screen shot of FIG. 16), a photo strip layout (as depicted in the screen shot of FIG. 17), choose a pre-made layout, or start from scratch. For example, the operator may be able to choose the size of the final layout (e.g. 1200×1800 pixels or 1800×1200 pixels) and a background image placed on the final photo. FIG. 18 depicts a screen shot showing various embodiments of pre-crated final layouts that an operator can choose. The pre-created layouts may be edited per the operator's desire. The background image may be a pre-made, solid color background or a custom design, which can be imported into the system. Preferably, the background is in .jpg format, although other formats may be used. Furthermore, the background image is preferably a specific size (e.g. the size of the final layout indicated herein). FIG. 19, for example, depicts a screen shot of a page for uploading background images. The background images may be rotated as photos are taken to provide a variety of layouts.

Figure 20:
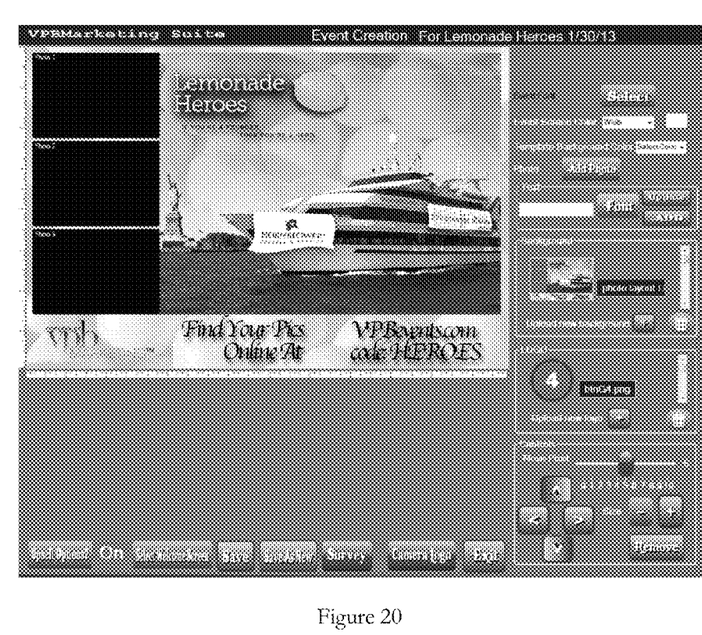

In the preferred embodiment, the photographs maintain an aspect ratio of 3:2, however other aspect ratios can be used. In a preferred embodiment, the operator is prompted to choose the positioning and size of at least one photo on the final layout. For example, FIG. 20 depicts an embodiment of a layout editor. The system 200 preferably saves the x and y coordinates of the location and size of the photo for application in the final layout.

Figure 21:
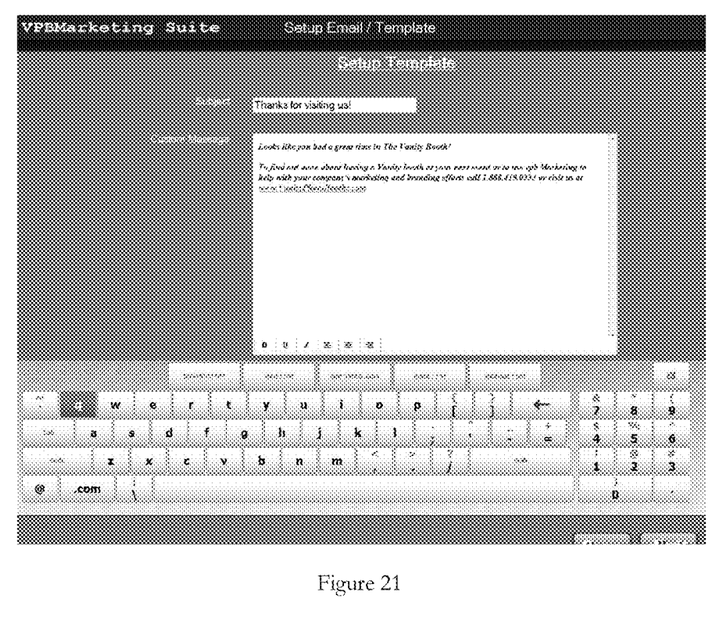

The operator may be prompted to add text to the final layout or to an email sent to the users. For example, FIG. 21 depicts a screen shot of an embodiment of a text editor. Preferably, the system 200 provides an on-screen interface for adding, editing, and formatting the text. Furthermore, the system may provide the operator with the opportunity to add additional graphics or other elements. The additional elements may be imported in .png format or another format. Preferably, the additional elements are place on top of the remaining elements in the final layout.

In the preferred embodiment, the system 200 may provide the operator with the opportunity to manipulate the elements (e.g. text, photos, and graphics) of the final layout via a graphic user interface (GUI). The GUI may allow the user to "drag" and "drop" elements to desired locations within the final layout.

The operator may also be able to control who can use the system by selecting an access method. For example, the operator may allow the system to be accessed for free, for a price or with an access code. Access codes can be alphanumerical and/or include symbols. Preferably, the access codes are randomly generated and include four or more characters. In a preferred embodiment, the access codes can be disseminated to potential users via email, regular mail (e.g. on tickets, cards, or mailers), text, handed out at an event, or other communication method. If the operator chooses to allow access via an access code, the user will be prompted to enter the code prior to using the system.

Figure 22:
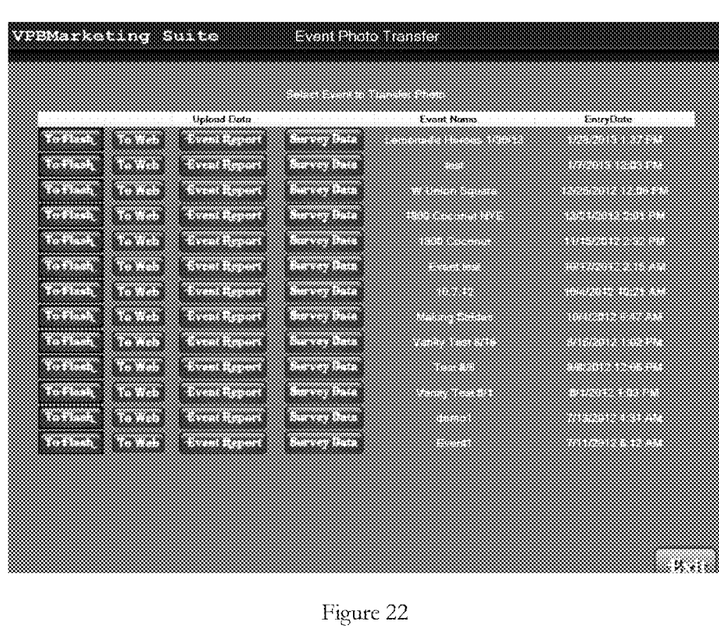
Figure 23:
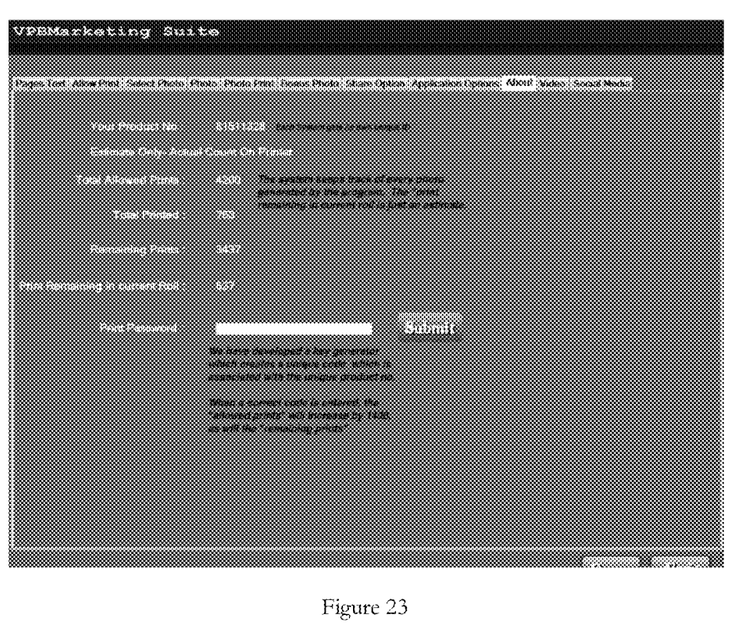

At the end of an event, throughout an event, or at another designated time, the operator may be able to obtain the survey response data, image data, other audio/visual data and/or other data obtained by the system from the users. For example the data can be downloaded to a flash drive or other portable storage device, uploaded to a website, emailed, or otherwise disseminated, as depicted, for example in FIG. 22. The image data may include both the individual photos taken and the final composite photos. Furthermore, the data may include an event report, including but not limited to: start and end times, number of photos taken, number of prints made, number of prints remaining to be made, number of social media posts, number of SMS or MMS messages, number of emails sent, a list of emails collected (which may be separated by "opt-in" and "opt-out"), and other data. For example, FIG. 23 depicts a screen shot of an embodiment of an event report. Furthermore, in the event that any part of the sequence is not completed, the operator may download the data via an administration screen within the program.

Figure 24:
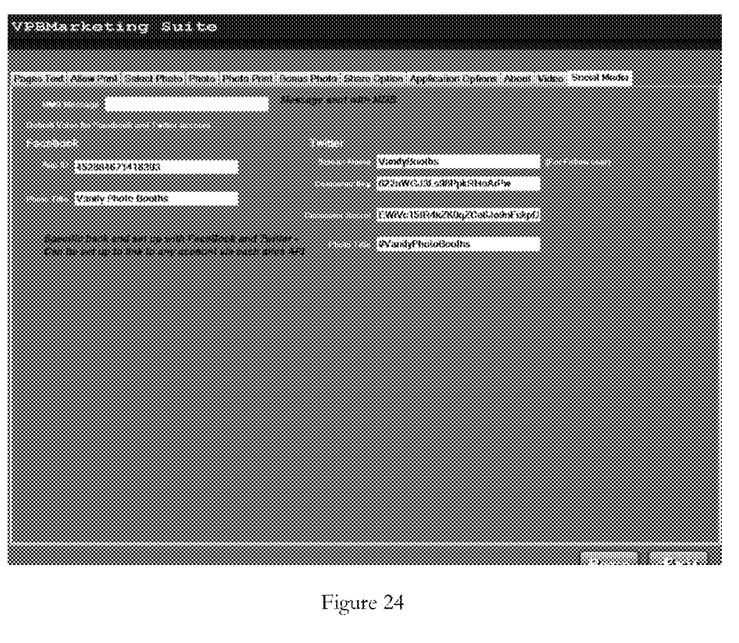

Additionally, in a preferred embodiment, the operator can upload one or more final composite photos to an online gallery. The operator may be able to password protect the online gallery to prevent public access. The online gallery may also include survey questions as described herein. The online gallery may be hosted by the operator, the owner of the system, or on another website. Furthermore, the operator may choose to have the final composite photos uploaded to a social media website (e.g. Facebook or Twitter). FIG. 24 show an example of a screen shot wherein the operator can input their social media data.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A system of obtaining an image of a user and survey data from the user during a photographic session, comprising:
   a processor;
   a digital imaging device in communication with the processor;
   at least one input device in communication with the processor;
   at least one output device in communication with the processor; and
   software executing on the processor, wherein the software:
      prompts the user to choose options for the photographic session;
      prompts the user to enter an answer to at least one survey question through the input device;
      directs the digital imaging device to obtain at least one image of the user upon receiving an answer to the at least one survey question;
      prompts the user to enter personal information through the input device;
      outputs the at least one image to the output device; and
      prompts a backend system administrator to create an event during which the images and survey answers are obtained via multiple photographic sessions; wherein the software maintains multiple events simultaneously.

2. The system of claim 1, wherein the at least one input device is chosen from the group comprising a touch screen, a keyboard, a microphone, a computer mouse, and a digital imaging device.

3. The system of claim 1, wherein the at least one output device is chosen from the group comprising a screen, a printer, a connection to a wide area network, a connection to a local area network, and a connection to the Internet.

4. The system of claim 1, wherein at least one input device and at least one output device are both a touch screen.

5. The system of claim 1, further comprising a housing, wherein the processor, the digital imaging device, at least one input device, and at least one output device are contained within the housing.

6. The system of claim 5, wherein the housing is a photo booth.

7. The system of claim 1, wherein the software further prompts the user to choose a layout for the at least one outputted image.

8. The system of claim 7, wherein the choice of layouts is determined by a backend system administrator.

9. The system of claim 8, wherein each layout is created by the backend system administrator.

10. The system of claim 1, wherein the personal information is at least one of an email address and social networking data.

11. The system of claim 1, wherein the software further:
   collects multiple answers to the at least one survey question from multiple users;
   compiles a database of answers; and
   outputs a report of the compiled answers.

12. The system of claim 1, wherein the software further:
   collects multiple images;
   compiles a database of images; and
   outputs the compiled images.

13. The system of claim 12, wherein software outputs the compiled images to a website.

14. The system of claim 1, wherein the software further:
   collects usage statistics;
   compiles a database of usage statistics; and
   outputs a report of the compiled usage statistics.

15. The system of claim 1, wherein the software further prompts the backend system administrator to select options to be presented to the user during the event.

16. The system of claim 1, wherein the output is a printed photograph.

17. A method of obtaining an image of a user and survey data from the user during a photographic session, comprising, on a processor:
   prompting the user to choose options for the photographic session;
   prompting the user to enter an answer to at least one survey question through at least one input device;
   directing a digital imaging device to obtain at least one image of the user upon receipt of the answer;
   prompting the user to enter personal information through the input device;
   outputting the at least one image to at least one output device;
   prompting a backend system administrator to create an event during which the images and survey answers are obtained via multiple photographic session; and
   maintaining multiple events simultaneously.

18. The method of claim 17, wherein the at least one input device is chosen from the group comprising a touch screen, a keyboard, a microphone, a computer mouse, and a digital imaging device.

19. The method of claim 17, wherein the at least one output device is chosen from the group comprising a screen, a printer, a connection to a wide area network, a connection to a local area network, and a connection to the Internet.

20. The method of claim 17, wherein at least one input device and at least one output device are both a touch screen.

21. The method of claim 17, wherein the processor, the digital imaging device, at least one input device, and at least one output device are contained within a housing.

22. The method of claim 21, wherein the housing is a photo booth.

23. The method of claim 17, further comprising prompting the user to choose a layout for the at least one outputted image.

24. The method of claim 23, wherein the choice of layouts is determined by a backend system administrator.

25. The method of claim 24, wherein each layout is created by the backend system administrator.

26. The method of claim 17, wherein the personal information is at least one of an email address and social networking data.

27. The method of claim 17, further comprising:
collecting multiple answers to the at least one survey question from multiple users;
compiling a database of answers; and
outputting a report of the compiled answers.

28. The method of claim 17, further comprising:
collecting multiple images;
compiling a database of images; and
outputting the compiled images.

29. The method of claim 28, further comprising outputting the compiled images to a website.

30. The method of claim 17, further comprising:
collecting usage statistics;
compiling a database of usage statistics; and
outputting a report of the compiled usage statistics.

31. The method of claim 17, further comprising prompting the backend system administrator to select options to be presented to the user during the event.

32. The method of claim 17, wherein the output is a printed photograph.

* * * * *